United States Patent Office 2,939,790
Patented June 7, 1960

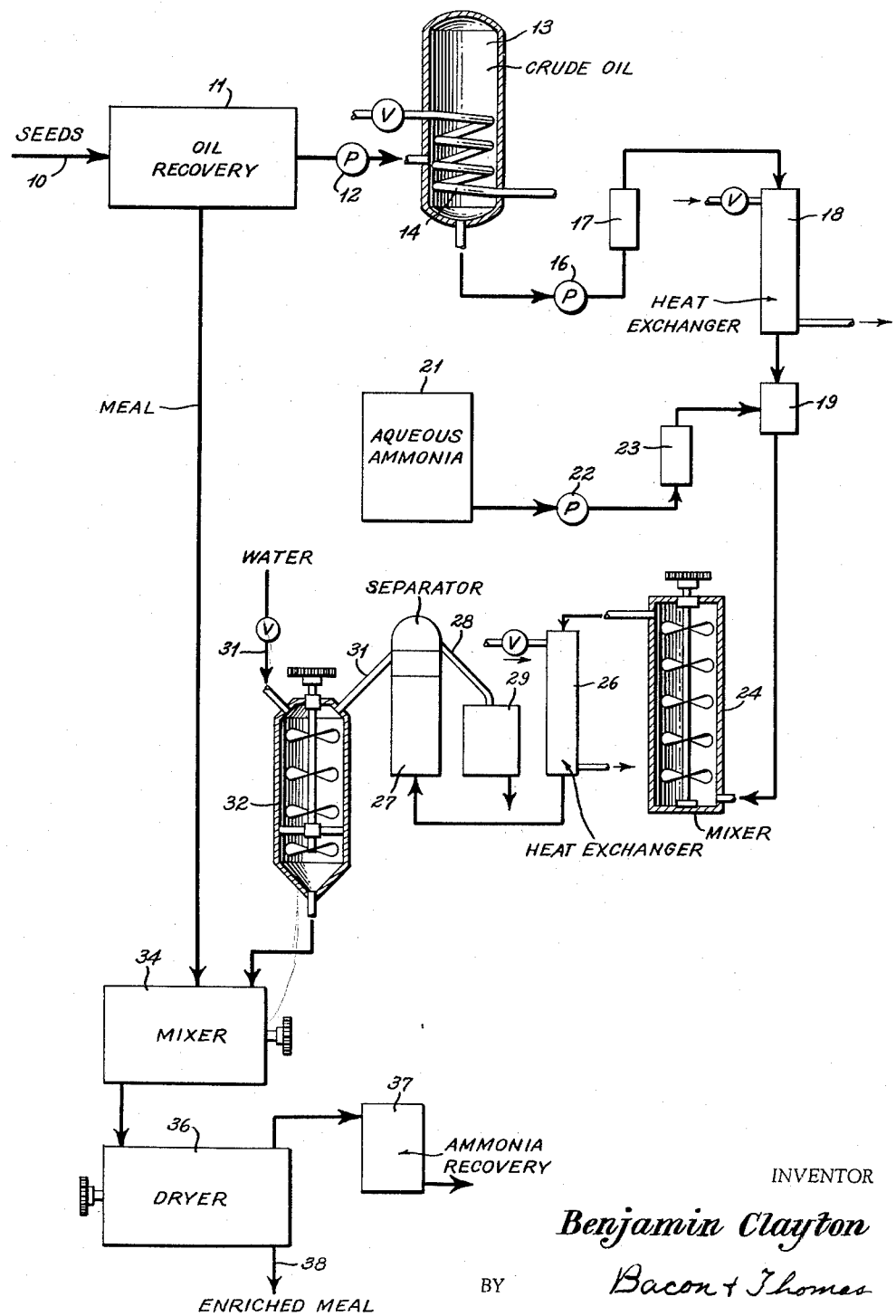

2,939,790

TREATMENT OF GLYCERIDE OILS AND PRODUCT OBTAINED THEREBY

Benjamin Clayton, 9 Shadder Way, Houston, Tex.

Filed Mar. 19, 1954, Ser. No. 417,302

12 Claims. (Cl. 99—2)

This invention relates to the treatment of glyceride oils and product obtained thereby and more particularly to an improved process of refining such oils in which an aqueous solution of ammonia is employed as the refining agent and a valuable animal food product is obtained.

The employment of ammonia either alone or in conjunction with water or alcohol in processes for removing free fatty acids from glyceride oils has been suggested in the prior art but the workers in the prior art have always considered it necessary to use large amounts of aqueous or alcoholic solutions of ammonia in order to produce a liquid phase insoluble in the oil and separable therefrom or to use very large amounts of liquid anhydrous or nearly anhydrous ammonia in the nature of a solvent for extracting impurities from glyceride oils. Such processes have not proved to have practical commercial utility.

In accordance with the present invention, I have discovered that very effective removal of free fatty acids and gums from glyceride oils containing the same can be accomplished by employing a very small amount of an aqueous solution of ammonia to cause formation of a mixture of ammonium soaps and ammoniated and hydrated gums which is continuously centrifugally separable from the resulting neutral oils. It has been further found that for effective separation the amounts of both ammonia and water must fall within rather narrow ranges. Amounts of ammonia which are too small will not neutralize to a desirable extent the free fatty acids nor the acidity of the gums. Too little ammonia will also produce foots or soap stocks which are sticky and difficult to separate from the oil and which occlude an undue amount of neutral oil even if the amount of water is within the correct range. On the other hand, an amount of ammonia which is too great results in an ineffective separation leaving an undue amount of foots or soap stock in the oil since increased amounts of ammonia lighten the foots and cause them to approach the specific gravity of the oil. Too small an amount of water even with a correct amount of ammonia results in incompletely precipitated gums such that the gums are not adequately separated from the oil and also results in foots or soap stock too stiff for efficient separation. Too large an amount of water unduly increases the amount of materials separated as foots and causes increased losses of neutral oil emulsified in the foots. In general the amount of water and ammonia should be such as to produce foots or soap stock which are plastic or semi-solid at the temperature of separation, the amount of ammonia being just sufficient to produce a type of foots which may be described as slippery as opposed to sticky. Such foots discharge cleanly and uniformly from the centrifugal bowl.

Best results have been obtained with centrifugal separators of the so-called hermetic type which have their bowls sealed from the atmosphere and which can be fed with materials under pressure. The conventional types of commercial centrifugal separators can, however, be employed particularly if a small flush of water or steam added to the pan for the heavy effluent is employed to wash the soap stock out of such pan. The separated semi-plastic foots contain a reduced amount of free oil and, since no neutral oil is saponified by the ammonia, the refining losses are very low.

The foots thus separated from the oil are essentially a phosphatide product when the oil being treated is a vegetable oil containing substantial amounts of gums. The product may be dried and the ammonia vaporized therefrom at moderate temperatures particularly if at least the latter part of the drying treatment is under vacuum. The resulting dried product is a mixture of fatty acids and phosphatidic material containing some neutral oil. It in general will have a much lower neutral oil content and a substantially higher free fatty acid content than the vegetable lecithins of commerce which are dried gums from a degumming operation in which the gums are precipitated with water alone.

The meal left after recovery of most vegetable oils from the seed material forms a valuable stock and poultry food. Modern methods of oil recovery have, however, become so efficient that the meal contains too little residual fat for high quality animal foods. The greater value of crude oil as compared to the value of the meal, however, makes it uneconomic to leave an increased amount of valuable oil in the meal. Attempts to find an inexpensive source of fatty material for addition to vegetable oil meals so as to improve their nutrient value have not been successful as the inexpensive fatty materials such as black grease or soap stock from conventional oil refining operations contain inorganic or other materials which impart deleterious properties to the food. Purified fats or fatty acids from such sources are too expensive for incorporation into the meal.

The dried and deammoniated phosphatide product of the present invention is an inexpensive food product which contains not only fatty material but which is a source of organic nitrogen and phosphorus and contains a substantial amount of vitamin B complex. It can be very advantageously employed to increase the fat or fatty acid content as well as otherwise increase the nutritional value of vegetable oil meals. Even the product from cotton seed oil containing a substantial amount of gossypol, which has been stated to be toxic to certain animals, can be subjected to a moderate heat treatment to deactivate the gossypol without substantial degradation of the food values of the product. The phosphatide product acts as a binder for and reduces dusting of the vegetable meal, imparts a desirable color thereto and appears to increase the palatability of the meal for animals in addition to imparting greater food value.

A particularly advantageous operation with most oils is to mix the ammoniated foots coming from the centrifugal separator with the meal from the oil recovery process before either product has been dried or otherwise treated. The mixture may then be dried so as to remove water or any residual oil solvent which may be present and at the same time vaporize ammonia from the mixture. It is very much easier to dry the granular mixture containing the meal particles than it is to dry the gummy phosphatide product from the centrifugal separator. The vaporized ammonia may be recovered if desired for reuse in the process and this is usually desirable but the amount of ammonia employed in the present process is sufficiently small that it is economically feasible to discharge it to waste. The product may however be dried and deammoniated before mixing with the vegetable oil meal before or after the latter is dried or stripped of solvent.

In the case of cotton seed foots containing gossypol it is desirable to first dry and deammoniate the foots in order to first obtain a product free from ammonia and to then subject the dried product after adding water to a heat treatment under pressure to deactivate the gossypol. A preferred treatment is to thoroughly mix the dried product with approximately 25% of its weight of water and then subject the resulting mixture to treatment at a temperature of 140° C. (284° F. and 55 p.s.i. steam pressure) for approximately 1 hour at which time the gossypol is substantially completely deactivated. Most of the gossypol is deactivated with a treatment at a temperature as low as 130° C. (260° F. and 40 p.s.i. steam pressure) for 30 minutes although better results are obtained with an hour treatment at this temperature and even better results at the preferred temperatures given above. High temperatures up to approximately 160° C. can be employed for approximately 30 minutes without damaging the product. The product after treating as above has a good odor and although viscous flows at room temperature. Some splitting of the glycerides present apparently occurs, but this is not an important factor since fatty acids appear to be as good as glycerides for animal feeds. Heat treatment under pressure as above described in the presence of the ammonia and water originally present will also deactivate the gossypol but removal of ammonia prior to the heat treatment is preferred. Such preferred operation produces a product which imparts a yellow color to the food product and may be added to the vegetable oil meal while still wet and then dried with the meal or it may be first dried and added to the meal, the first operation being preferred.

The oil separated from the foots in the refining process is substantially neutral but will usually contain a small amount of ammonium soaps. Furthermore, if the original oil was dark in color the refined oil will usually also be dark in color as ammonia is not an efficient decolorizing agent. The residual ammonium soaps can be removed from the oil by a water washing operation involving the mixing of a stream of water with a stream of the oil and subjecting the resulting mixture to continuous centrifugal separation. A water phase containing the ammonium soap separates cleanly from the oil with substantially no additional refining loss. With light colored oils the washing treatment is sufficient for some uses of the oil but for other uses and dark colored oils it is desirable to re-refine the oil employing a small amount of a strong caustic soda solution. A stream of the caustic soda solution may be mixed with a stream of the oil and the resulting mixture continuously centrifugally separated to separate a small amount of an extremely dark colored aqueous phase from a relatively light colored oil phase. The losses in such a re-refining operation, if properly conducted, can also be made very small. Best results are obtained by first washing the ammonia refined oil with water, then re-refining with caustic soda and again washing with water although the first washing step can be omitted.

The process of the present invention thus provides an improved manner of refining substantially all types of glyceride oils with low losses and at the same time producing an inexpensive phosphatide product which can be used commercially for most of the known uses of commerical vegetable lecithins or which has particular value for incorporation in the meal from which the oil is recovered to provide an enriched animal food.

It is therefore an object of the present invention to provide an improved process for refining glyceride oils in which a small amount of an aqueous solution of ammonia is employed as the refining reagent.

Another object of the invention is to provide a continuous process of refining glyceride oils in which amounts of water and ammonia which will produce a neutral oil and the effective separation of a plastic or semi-solid soap stock containing a reduced amount of free oil.

Another object of the invention is to provide an improved process of producing refined oils wherein two by-products thereof are combined to produce an enriched animal foodstuff.

Other objects and advantages of the invention will appear in the following description of a preferred embodiment of the invention which can be carried out in the apparatus shown diagrammatically in the attached drawing.

As shown in the attached drawing oil seeds may be delivered as indicated by the arrow 10 into an oil recovery process 11 which may be of any suitable type either involving pressing or solvent extraction operations or both. The oil from the recovery process 11 may be delivered by means of a pump 12 into a crude oil storage tank 13 which may be provided with any suitable means for heating the oil therein such as a heating coil 14. Oil from the tank 13 may be delivered by means of a pump 16 through a liquid meter 17 and a heat exchanger 18, which may be any suitable type of indirect heat exchanger, to a flow mixer 19. Aqueous ammonia of suitable concentration may be withdrawn from a source of supply shown as a tank 21 by means of a pump 22 and delivered through a liquid meter 23 to the flow mixer 19. The resulting mixture is then preferably subjected to a further mixing action in a mixer 24 and then passed through another heat exchanger 26 and delivered into a continuous centrifugal separator 27. Oil may be discharged from the separator 27 as the light effluent through a conduit 28 into a closed and vented receiver 29 from which it may be delivered to any further desired treating step such as re-refining with a strong caustic alkali to reduce the color or free fatty acid content of the oil or both. A water washing step to remove residual ammonia and ammonium soap from the oil may precede the treatment with caustic soda in which case another water washing treatment will ordinarily be employed after the treatment with caustic soda to remove residual caustic soda and soap from the oil. All of such treatments may be continuous operations involving continuous mixing of water or reagent with the oil and continuous centrifugal separation. Such operations form no part of the present invention and are not illustrated in the drawing although one or more such operations is in general necessary to produce a commercially refined oil.

The foots or soap stock forming the heavy effluent may be discharged from the separator 27 through a conduit 31 and delivered into a closed and vented receiver 32 which may be in the form of a mixer. The centrifugal separator 27 is preferably of the hermetic type, that is to say, the inlet to the centrifugal bowl is through a seal so that pressure may be maintained upon the material entering the bowl and the material in the bowl. Such a centrifugal bowl has constricted discharge openings for the light and heavy effluents which openings are usually adjustable thus enabling any desired pressure within wide limits to be maintained within the bowl. Soap stocks or foots which are quite stiff or viscous so long as they are not sticky may be discharged from such a centrifugal separator by reason of the pressure maintained in the bowl. With such a centrifugal separator no flush of water is required in the pan for the heavy effluent. Relatively viscous non-sticky foots of the type produced in the present invention can, however, be discharged from conventional centrifugal separators having open bowls, in which case a water or steam flush employed in the discharge pan for the heavy effluent to wash the foots therefrom may be required.

The foots discharged through the spout 31 from the centrifugal separator 27 may be too stiff to flow readily from the receiver 32 in which case additional water can be added as indicated at 33 and the resulting mixture agitated in the receiver 32 to produce a flowable mixture. This mixture may be delivered into a mixer 34 along with the meal from the oil recovery process 11 and thoroughly mixed with such meal. Any suitable type of mixer may be employed, for example, a conventional horizontal mixer employing rabble arms (not shown). The resulting mixture may be delivered into a dryer 36 of any suitable type. The mixture may be heated in any suitable manner in the dryer and in general heated gases will be brought into contact with the material being dried. The ammonia may be stripped from the discharged gases in an ammonia recovery system 37, for example, by passing the gases through a spray of water or dilute aqueous ammonia solution but as stated above the process can be economically operated even if the ammonia is not recovered. Enriched meal may be discharged from the dryer 36 as indicated at 38. As stated above cottonseed foots may be subjected to a heating treatment in the presence of water to deactivate the gossypol contained therein prior to mixing the foots with the oil seed meal.

In carrying out the process of the present invention seeds entering the oil recovery process may be subjected to any of the known oil recovery steps in order to produce a crude oil and a residual meal. The meal will ordinarily be of very low fat content because of the efficiency of modern oil recovery processes and in fact such meal is usually too low in fat to provide a desirable animal food product.

The crude oil from modern oil recovery processes will ordinarily contain between approximately .3 and 2.5% free fatty acids and between .75 and 3.0% gums, both percentages based on the weight of the oil, as well as minor amounts of other impurities. It has been found that efficient refining with small amounts of ammonia and water may be accomplished if the amount of ammonia employed ranges from approximately 7.5% by weight of the free fatty acids plus 1% by weight of the gums up to approximately 45% of the weight of the free fatty acids plus 6% of the weight of the gums. Also the amount of water employed as part of the aqueous ammonia will ordinarily fall between 30 to 65% of the total weight of the gums and free fatty acids in the oil. The amounts of ammonia within the ranges given can be selected to produce aqueous ammonia solutions having a concentration between 5 and 29% and concentrations within this range produce the best result and should ordinarily be employed. While a range of fatty acids and gum contents of the usual oils has been given above it is not to be understood that the invention is limited to the treatment of oils having free fatty acids and gum contents within the ranges given since the amounts of ammonia and water given above and based on the free fatty acid and gum contents are applicable to oils having free fatty acids and gum contents without the ranges mentioned as long as the concentration of the aqueous ammonia solution remains within the range given.

For most efficient operation, it has been found that the temperature of separation should be in the neighborhood of 140° F., although the process is operative with temperatures of separation ranging from approximately 130 to 155° F. If the temperature is too low the soap stock tends to be too viscous and the oil is not adequately refined whereas if the temperature is too high the ammonia soaps tend to become soluble in the oil and gassing due to vaporization of ammonia may interfere with separation.

It does not appear to be material whether the oil is heated before admixture with the aqueous ammonia solution or later heated so long as the temperature of the mixture is within the range above given during separation. That is to say, the oil may be heated to the temperature of separation in the crude oil storage tank 13 by means of the heating coil 14 or it may be heated in the heat exchanger 18 prior to admixture with the aqueous ammonia. At the elevated temperature mixing is more rapid in the mixers 19 and 24 although oil at ordinarily ambient temperatures can be delivered into these mixers in which case a somewhat longer time of mixing will usually be desirable in the mixer 24. In both the mixers 19 and 24 it is desirable to avoid too violent agitation as such violent agitation results in a tightly emulsified mixture which is difficult to separate. The mixing action in the mixers and particularly in the mixer 24 should therefore be relatively mild. Continued mixing for a period of time has, however, been found desirable and such time may range, for example, from 5 to 30 minutes. If no preheating prior to mixing has been employed, the heater 26 may be employed to bring the mixture to the desired separation temperature. Thus, either heating prior to mixing or heating after mixing may be employed and it is also possible to partially heat before mixing and complete the heating after mixing.

The amount of water added to the foots in the mixer 32 will ordinarily be just sufficient to produce a flowable mixture. In some cases the foots will be sufficiently flowable without adding water and this is particularly true where a water flush is employed in the centrifugal pan. The addition of water does assist in mixing the foots with the meal in the mixer 34. The temperature of mixing in such mixer is not critical and may be that of the foots and meal discharged from the other portions of the process but may be higher. The temperatures reached in the dryer 36 are also not critical and will ordinarily be below 212° F.

In the case of cotton seed foots, instead of being delivered from the tank 32 into the mixer 34 for admixture with the seed meal, the foots may be subjected to a heat treatment to deactivate gossypol before being admixed with the meal. Such treatment is preferably carried out under pressure and at temperatures above the boiling point of water, for example, 130 to 160° C. for times ranging from 30 minutes at the higher temperatures to 2 hours at the lower temperatures. This heating is preferably carried out in the presence of water, for example, 20 to 50% of water based on the weight of the dried and deammoniated foots. As stated above, the original water and ammonia present in the foots may be employed in the heating step but it is preferred to first dry the foots at a relatively low temperature, i.e. at temperatures below the boiling point of water and under vacuum to remove water and substantially all of the ammonia. Water may then be thoroughly mixed with the foots prior to the heat treatment discussed above. Attempts to heat treat the dry foots to inactivate the gossypol have not been successful as the gossypol was not effectively inactivated and the foots were degraded by becoming resinified and darkened, whereas heating under pressure in the presence of water improves the color and texture. The wet foots from the heat treating operation may be added to seed meal for example by delivering them to the mixer 34 for mixing with the meal and subsequent drying.

The foots from the process of the present invention applied to crude oils containing substantial amounts of gums, such as crude soya bean oil or cottonseed oil, are unusually low in free oil content, i.e. below 20% free oil by weight on a dry basis for oils having low free fatty acid content and well below 30% for oils having high free fatty acid content. Since the ammonia does not saponify free oil this means that the loss of neutral oil, which is the most valuable part of the crude oil, is always low. This neutral oil content plus the free fatty acid content of the dried and deammoniated foots as well as the fatty acid content of the phosphatides and other nutritional values present makes the foots valuable for addition to vegetable seed meals as an animal food.

The neutral oil separated from the foots in the ammonia refining process of the present invention contains a small amount of residual ammonium soaps. Such soap can be easily washed from the oil with substantially no additional loss of oil to produce a refined oil if the oil is originally light in color. Such a washing operation involves mixing a stream of water with the oil and then continuously centrifugally separating the water containing the residual ammonium soap from the oil. The amount of water will usually be about 3% by weight but may be as high as 15%. For dark colored oils such as cotton seed oils it is usually necessary to re-refine the ammonia refined oil, preferably after water washing as above described, with a small amount of a strong caustic soda solution. Such re-refining operations are well known, involve very little loss of oil and can also be applied to light colored oils if desired. The re-refined oils are again preferably washed with water. All of the above described steps including ammonia refining, water washing, and re-refining can be carried out with an oil solvent, such as commercial hexane, present if the amount of solvent does not exceed 50% of the oil by weight and preferably does not exceed 25% of the oil by weight. Thus the process is applicable to solvent extracted oils prior to removal of all of the solvent.

As a specific example a solvent free solvent extracted crude soya bean oil containing 0.85% free fatty acids by weight and having a Wesson loss of 2.2%, i.e. having a gum content of 1.35% by weight, was refined employing 1.08% water and 0.18% ammonia, both by weight based on the oil, i.e. 1.26% of a 14% ammonia solution. The percentage of solution employed is based on the weight of the oil and the percentage of ammonia in the solution is based on the weight of the solution. The amount of ammonia can be stated as 18% of the free fatty acids or 0.15% of the oil plus 2.25% of the gums or 0.03% of the oil or a total of 0.18% of the oil. The amount of water was 49% of the total weight of the free fatty acids and gums.

The crude oil was heated in a storage tank to 140° F. and was delivered through a pump and meter to the mixer. The ammonia solution was also delivered through a pump and meter to the mixer and initial mixing was merely by flowing the streams together. The initial mixture was passed through a vertical mixer provided with a plurality of spaced paddle blades extending horizontally from a vertical shaft and rotated thereby so as to subject the oil to relatively mild mixing, the time in the mixer being approximately 6 minutes. The temperature of the resulting mixture was a few degrees C. below 140° F. and was sent through a heat exchange in indirect heat exchange with a heating medium to raise its temperature to 140° F. The heated mixture was delivered into a conventional open type centrifuge and continuously centrifugally separated into a neutral oil and ammonia foots or soapstock.

As pointed out earlier, a centrifuge of the sealed or vapor-tight type might be advantageously used at this point.

The refining loss in the ammonia refining step was approximately 2.38% i.e. not much greater than the Wesson loss. The separated oil contained 0.11% free fatty acids and 0.07% gums. The foots or soapstock had a moisture and volatile content of 21.3% based on the total weight of the wet ammoniated foots and contained 14.0% free glyceride oil and 12.6% free fatty acids on a dried and deammoniated basis, the remaining 73.4% being mostly phosphatides with small amounts of other materials including vitamin B complex. The wet foots, when added directly to a seed meal such as the soya bean meal resulting from the recovery of the original soya bean oil and the resultant mixture dried, imparts increased nutritional values and improves the appearance and physical properties of the meal.

As another specific example a crude cotton seed oil having a free fatty acid content of 2.5% by weight and a Wesson loss of 4.17%, i.e. a gum content of approximately 1.7% by weight of the oil was refined with an ammonia solution. The actual steps employed including the rate of flow of oil and the heating and mixing operations were the same as the preceding example. However, the amount of ammonia was 0.21% by weight based on the weight of the crude oil, which is approximately 7.5% by weight of the fatty acid content plus 1% by weight of the gum content of the crude oil. The amount of water was 1.29% by weight of the oil or 30% of the combined weight of the free fatty acids and gums, the amount and concentration of the ammonia solution being 1.5% of a 14% solution. The refining loss in the ammonia refining step including the ammonium soap remaining in the oil and which must be washed therefrom was 5.71% and a further loss of approximately 0.3% must be expected in the re-fining required by cotton seed oil to give a total refining loss of approximately 6%. The separated oil contained about 0.1% free fatty acids, no detectable phosphatides and about 0.28% fatty acids combined with ammonia as residual ammonium soap which can be washed from the oil. The foots contained 20.7% water and volatiles on the basis of the weight of the wet ammoniated foots and contained 25.6% free oil and 32.6% free fatty acids based on the weight of the dried and deammoniated product, the remaining 41.8% being largely phosphatides. This particular crude cotton seed oil was an oil obtained by a hydraulic pressing operation and very low in gossypol. That is to say it had a gossypol content of 0.012%. The ammonia refined oil had a gossypol content of 0.005% substantially all of which is removed in a subsequent caustic soda re-refining step. The foots contained only 0.38% gossypol on a dry basis such that they can be added directly to animal foodstuffs without heat treatment to deactivate gossypol although such heat treatment may be employed, if desired. It is, however, possible to add cotton seed foots having gossypol contents as high as about 0.6% to vegetable meals for animal foods, such as cattle feeds, without exceeding the required limit of gossypol.

In similar ammonia refining operations on cotton seed oil, foots having as high as 5.4% free gossypol have been encountered. In this case the oil being ammonia refined was a directly extracted crude cotton seed oil. When such foots are heated to approximately 140° C. for a period of 1 hour in the presence of about 25% of their dry weight of water, the gossypol content is reduced to well below 0.6%.

I claim:
1. The process of treating a glyceride oil containing free fatty acids and gums, which comprises; mixing said oil with an aqueous solution of ammonia, the weight of water in the solution being approximately 30%–65% of the combined weight of the free fatty acids and gums and the weight of the ammonia being between approximately 7.5% of the weight of said free fatty acids plus 1% of the weight of said gums and 45% of the weight of said free fatty acids plus 6% of the weight of said gums; continuously centrifugally separating the resulting mixture to recover a purified oil and foots comprising a phosphatidic product, said foots containing water and ammonia; and subsequently removing ammonia and water vapor from such foots.

2. The process as defined in claim 1 in which said foots are centrifugally separated from the oil in a space closed from the atmosphere and while the oil is under superatmospheric pressure therein.

3. The process as defined in claim 1 in which the resulting phosphatide product is mixed with a vegetable oil meal containing water, and in which the resulting mixture is heated sufficient to vaporize water therefrom thereby providing an animal feed product.

4. The animal feed product produced by the process of claim 3.

5. A process as defined in claim 1 in which said foots are centrifugally separated from the oil while the oil is at substantially atmospheric pressure, and in which a stream of aqueous material is delivered to the zone of separation of the foots to assist flow of the foots therefrom.

6. The process of treating a glyceride oil containing free fatty acids and gums and containing substantial amounts of gossypol, which comprises: mixing an aqueous ammonia solution with the oil to produce foots, the weight of water in the solution being approximately 30%–65% of the combined weight of the free fatty acids and gums and the weight of the ammonia being between approximately 7.5% of the weight of said free fatty acids plus 1% of the weight of said gums and 45% of the weight of said free fatty acids plus 6% of the weight of said gums; continuously separating said foots from the oil, said foots being a phosphatidic product containing said gums in substantially nondegraded state and reaction products resulting from the reaction of said ammonia and with at least some of said free fatty acids, said gums containing gossypol in toxic amounts; drying the separated foots to volatilize at least some of the ammonia; adding to the dried foots an amount of water up to about 50% by weight of the dried foots; and then heating said foots under pressure sufficient to prevent vaporization of water to a temperature of at least about 130° C. for a time sufficient to substantially detoxify the gossypol.

7. An integrated process for producing an animal feed product from a vegetable oil bearing material, which process includes the steps of: solvent extracting said material to produce a meal product containing residual solvent and a crude glyceride oil containing gums and fatty acids; mixing with said crude glyceride oil an aqueous solution of ammonia in sufficient amount to precipitate said gums and react with at least a part of said fatty acids to produce ammonium soaps; separating the mixture into oil and foots, said foots containing ammoniated gums and ammonium soaps; returning to and mixing with said meal product at least a part of said foots while containing at least a part of said ammonium soaps; and heating the meal product mixture to a temperature sufficient to vaporize residual solvent and decompose such soaps therein to produce ammonia and free fatty acids, the ammonia and solvent vapors being removed from said meal product mixture.

8. A process as defined in claim 7 in which said foots are heated to remove some of the ammonia therefrom at a time prior to admixture of said foots and said meal product, thereby producing a treated foots product containing ammoniated gums and fatty acids and the remaining ammonium soaps, said treated foots product being mixed with said meal product.

9. A continuous integrated process for producing an animal feed product from vegetable oil bearing material comprising the steps of: processing such material to produce a meal product and a vegetable oil product containing fatty acids and phosphatidic materials comprising gums; mixing with the vegetable oil product an aqueous solution of ammonia capable of precipitating said phosphatidic material without substantial degradation thereof, the aqueous ammonia solution being of a concentration of about 5–29% and being added in sufficient quantity to also react with a part of said fatty acids to produce ammonia soaps; separating from said oil mixture nutritional soapstock containing substantial quantities of the nondegraded natural phosphatic materials and containing also ammonia soaps; mixing said nutritional soapstock with the meal product of the vegetable oil bearing material; and heating the mixture of said meal product and said soapstock sufficient to remove ammonia therefrom to convert at least some of said ammonia soaps to fatty acids in the presence of said meal product to produce said fatty acids in situ in the meal product.

10. An integrated process for producing an animal feed product from a vegetable oil bearing material, which process includes the steps of: processing such material to produce a meal product and a crude glyceride oil containing gums and free fatty acids; mixing with said crude glyceride oil an aqueous solution of ammonia in sufficient amount to precipitate said gums and react with at least a part of said fatty acid to produce ammonium soaps, the weight of water in said solution being approximately 30%–65% of the combined weight of the free fatty acids and gums, the weight of the ammonia being between approximately 7.5% of the weight of said free fatty acids plus 1% of the weight of said gums and 45% of the weight of said free fatty acids plus 6% of the weight of said gums; separating the mixture into oil and foots, said foots containing ammoniated gums and ammonium soaps; mixing together portions of the foots and the meal product while the former contains ammonium soaps; heating the mixture to a temperature sufficient to decompose the ammonium soaps of the foots thus mixed with the meal product to liberate ammonia and produce fatty acids in situ in the meal product; and removing ammonia from the meal product mixture.

11. An integrated process for producing an animal feed product from a vegetable oil bearing material, which process includes the steps of: processing said material to produce a meal product and a crude glyceride oil containing gums and fatty acids; mixing with said crude glyceride oil an aqueous solution of ammonia in sufficient amount to precipitate said gums and react with at least a part of said fatty acids to produce ammonium soaps; separating the mixture into oil and foots, said foots containing ammoniated gums and ammonium soaps; returning to and mixing with said meal product at least a part of said foots while the latter contains ammonium soaps; heating the mixture to a temperature sufficient to decompose said ammonium soaps, the decomposition producing fatty acids in situ in said meal product and liberating ammonia, said heating being sufficient to remove water vapors from said mixture; and removing water vapors from the mixture with the liberated ammonia.

12. The meal product mixture produced by the process of claim 11.

References Cited in the file of this patent

UNITED STATES PATENTS

| | | |
|---|---|---|
| 1,553,634 | Sawyer | Sept. 15, 1925 |
| 2,168,532 | McMath et al. | Aug. 8, 1939 |
| 2,472,663 | Kleine et al. | June 7, 1949 |
| 2,504,159 | Singer et al. | Apr. 18, 1950 |
| 2,686,794 | Clayton | Aug. 17, 1954 |

OTHER REFERENCES

Bailey-Cottonseed: Interscience Pub., New York, 1948, pp. 367, 691–693 and 702–704.

Markley: Soybeans and Soybean Products, II, 1951, Interscience Pub., New York, p. 646.